(12) United States Patent
Sasaki

(10) Patent No.: US 7,450,330 B2
(45) Date of Patent: Nov. 11, 2008

(54) LIBRARY APPARATUS, CONTROL METHOD AND CONTROL PROGRAM THEREOF, AND INFORMATION PROCESSING APPARATUS

(75) Inventor: Shinobu Sasaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/254,503

(22) Filed: Oct. 20, 2005

(65) Prior Publication Data
US 2007/0008640 A1    Jan. 11, 2007

(30) Foreign Application Priority Data
Jul. 8, 2005    (JP) ............................. 2005-200204

(51) Int. Cl.
G11B 15/18    (2006.01)
G11B 7/085    (2006.01)

(52) U.S. Cl. ..................................... 360/69; 369/30.38

(58) Field of Classification Search ........................ None
See application file for complete search history.

(56) References Cited

U.S. PATENT DOCUMENTS

| | | | | |
|---|---|---|---|---|
| 5,341,258 A | * | 8/1994 | Chalmers et al. ............... | 360/92 |
| 5,894,461 A | * | 4/1999 | Fosler et al. ............... | 369/30.31 |
| 6,005,734 A | | 12/1999 | Shimada et al. | |
| 6,134,071 A | * | 10/2000 | Andoh et al. .................. | 360/75 |
| 6,781,911 B2 | * | 8/2004 | Riesenman et al. ......... | 365/226 |
| 6,943,976 B2 | * | 9/2005 | Goodman et al. ............. | 360/69 |
| 2006/0072380 A1 | * | 4/2006 | Fujiwara et al. .......... | 369/30.01 |

FOREIGN PATENT DOCUMENTS

| | | |
|---|---|---|
| JP | 05-282764 | 10/1993 |
| JP | 9-198755 | 7/1997 |
| JP | 11-149696 | 6/1999 |

* cited by examiner

*Primary Examiner*—Jason C Olson
(74) *Attorney, Agent, or Firm*—Greer, Burns & Crain, Ltd.

(57) ABSTRACT

Disclosed is a configuration to implement a robot replacement in a library apparatus while maintaining an electrically-activated state. In such a configuration, the library apparatus storing a recording medium (cartridge) for writing and reading information with a host computer, comprises a plurality of robot units, which carries the recording medium; and a control unit (library control unit) which stops power feeding to the robot units if an event is generated until processing time of the event or predetermined time elapses and which transmits to a query from the host computer a response representing that the processing of the event is in progress.

20 Claims, 11 Drawing Sheets

LIBRARY APPARATUS, CONTROL METHOD AND CONTROL PROGRAM THEREOF, AND INFORMATION PROCESSING APPARATUS

CROSS-REFERENCE TO RELATED APPLICATIONS

This application is based upon and claims the benefit of priority from the prior Japanese Patent Application No. 2005-200204, filed on Jul. 8, 2005, the entire contents of which are incorporated herein by reference.

BACKGROUND OF THE INVENTION

1. Field of the Invention

The present invention relates to a library apparatus which stores a multiplicity of cartridge-type recording media as well as performs processing for write/read of information and the like in conjunction with a host computer and, especially relates to a library apparatus, control method and control program thereof, and an information processing apparatus for storing, recording and regenerating the cartridge-type recording medium stored in a locker with a robot (an accessor).

2. Description of the Related Art

The cartridge-type recording medium is a recording medium, such as a magnetic tape, stored in a cartridge. The library apparatus is provided with a locker in order to receive and store the cartridge-type recording medium and uses a robot which is a cartridge carrying mechanism for reception, storage and taking out thereof. The robot is replaced as needed by periodical maintenance.

For the replacement of the robot of the library apparatus, Japanese Patent Application Laid-Open Publication No. H09(1997)-198755 (paragraph number 0021, FIG. 1 to FIG. 3 and the like) discloses measurement of relative positions of an accessor and a frame after replaced at the time of replacement of the accessor (robot), and Japanese Patent Application Laid-Open Publication No. H11(1999)-149696 (paragraph number 0040, FIG. 1, FIG. 2 and the like) discloses update of position information of the frame in the case that the configuration of the library apparatus is changed.

By the way, in terms of the library apparatus, the robot replacement by periodical maintenance is indispensable and inevitable. Conventionally, since the robot replacement is performed while halting the operation of the library apparatus, backup software thereof is also halted, of course. Also, since the robot replacement work concerns not only an operator but an operations manager, if the operation is halted for a prolonged period of time, system operation and information processing are considerably affected.

In Japanese Patent Application Laid-Open Publication Nos. H09(1997)-198755 and H11(1999)-149696 mentioned above, such a problem is not disclosed, and no configuration is disclosed or indicated for resolving the problem.

SUMMARY OF THE INVENTION

It is therefore an object of the present invention to implement event processing, such as the robot replacement in the library apparatus, without releasing linkage relationship with a host computer.

In other words, a specific object of the present invention is to implement event processing, such as the robot replacement, without halting backup software, while continuing writing to a tape in a drive, and without affecting system operation, i.e., while maintaining an electrically-activated state, for example.

In order to achieve the above object, according to a first aspect of the present invention there is provided a library apparatus storing a recording medium for writing and reading information with a host computer, comprising a plurality of robot units, which carries the recording medium; and a control unit, which stops power feeding to the robot units if an event is generated until processing time of the event or predetermined time elapses and which transmits to a query from the host computer a response representing that the processing of the event is in progress.

In such a configuration, the event is an event which necessitates halting of the robot unit, such as replacement, maintenance, inspection and failure of the robot unit, components thereof and the like. Therefore, based on the generation of the event, power feeding to the robot unit is stopped until event processing time or predetermined time elapses, and the response to the query from the host computer is made for indicating that the event is under processing, from the control unit to the host computer. In regard to the event processing time or predetermined time, the event processing time is time necessary for the event processing, and the predetermined time is appropriate time when assuming the case that the time necessary for the event processing is prolonged. In such a configuration, for the robot unit to which power feeding is stopped, processing can be performed for replacement, maintenance, inspection, failure correction and the like of the robot unit, components thereof or others. Since the robot unit is halted due to the stoppage of power feeding, safety of the operator and the like is ensured.

The library apparatus may be configured to be provided with an information input unit for inputting information representing the event generation. The library apparatus may be configured to automatically detect the event generation on the control unit side or may be configured such that a user inputs information representing the event generation from an input unit. In the latter case, an amount of freedom is expanded for the user halting the robot unit.

In the library apparatus, the control unit may be configured to monitor elapsed time from the stoppage of power feeding to the robot unit and to generate a notification output representing that the predetermined time has elapsed. According to such a configuration, the generation of the notification output can trigger release of transmission and reception of information with the host computer within the predetermined time period.

In order to achieve the above object, according to a second aspect of the present invention there is provided a control method of a library apparatus storing a recording medium for writing and reading information with a host computer, the method comprising the operations of carrying the recording medium; and stopping power feeding to the robot units if an event is generated until processing time of the event or predetermined time elapses and transmitting to a query from the host computer a response representing that the processing of the event is in progress.

According to such a configuration, for the robot unit to which power feeding is stopped, processing can be performed for replacement, maintenance, inspection, failure correction and the like of the robot unit, components thereof or others, and since the robot unit is halted due to the stoppage of power feeding, safety of the operator and the like is ensured.

In order to achieve the above object, according to a third aspect of the present invention there is provided a control program of a library apparatus storing a recording medium for writing and reading information with a host computer, the program comprising the steps of carrying the recording medium; and stopping power feeding to the robot units if an event is generated until processing time of the event or a predetermined time elapses and transmitting to a query from the host computer a response representing that the processing of the event is in progress.

According to such configuration, by making computer execute the above described control program, for the robot unit when power supply is stopped, operations for replacement, maintenance, inspection, failure correction etc. of the robot unit, components, etc. can be performed while the robot unit is stopped by the stoppage of power supply, so that safety of the operator is assured.

In order to achieve the above object, according to a forth aspect of the present invention there is provided an information processing apparatus comprising a host computer and a library apparatus storing a recording medium for writing and reading information, wherein the library apparatus comprises a plurality of robot units, which carries the recording medium; and a control unit, which, if an event is generated, transmits to a query of the host computer a notification representing the processing of the event, which stops power feeding to the robot units during the processing period of the event and which resumes the power feeding to the robot units after completion of the processing of the event or after a predetermined time has elapsed to accept an instruction from the host computer.

According to such a configuration, in the information processing apparatus constituting a linkage system of the host computer and the library apparatus, for the robot unit to which power feeding is stopped, processing can be performed for replacement, maintenance, inspection, failure correction and the like of the robot unit, components thereof or others, as the event processing on the library apparatus side. As described above, since the robot unit is separated due to the stoppage of power feeding, safety of the operator and the like is ensured for the operation such as the replacement of the robot unit.

Technical features and advantages of the present invention are as follows.

(1) The event processing such as maintenance and inspection of the robot unit can be achieved in a standby state by selectively stopping power feeding to the robot unit, while maintaining a state enabling information processing between the host computer and the library apparatus.

(2) Without releasing a linkage relationship between the library apparatus and the host computer, the event processing can be performed on the library apparatus side, and the information processing with the host computer can be continued during the event processing.

Other objects, features and advantages of the present invention will become more apparent by reference to the accompanying drawings and the embodiments.

DETAILED DESCRIPTION OF THE PREFERRED EMBODIMENTS

Figure 1:
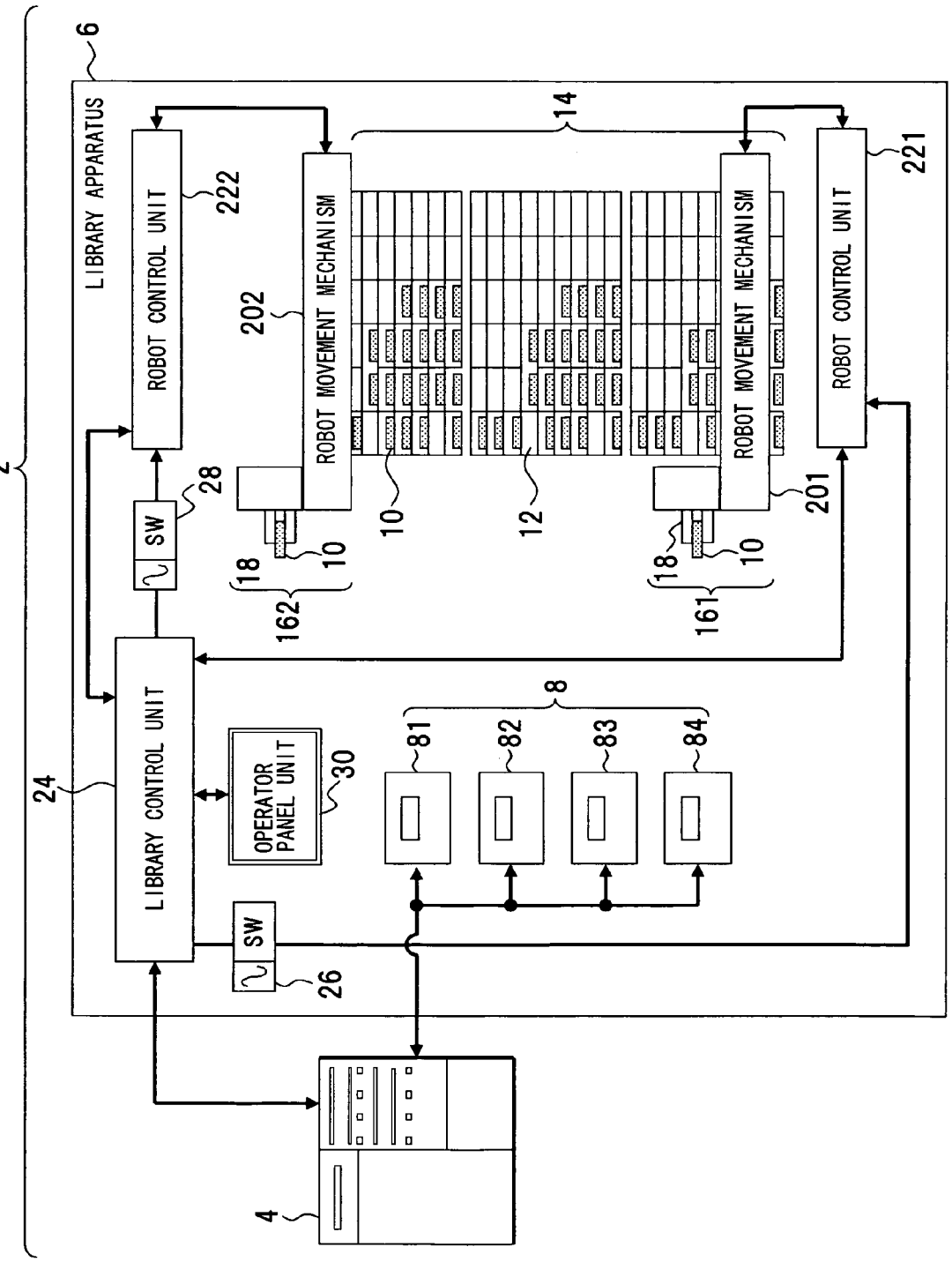
FIG. 1 is a block diagram showing an information processing apparatus provided with a library apparatus.
Figure 2:
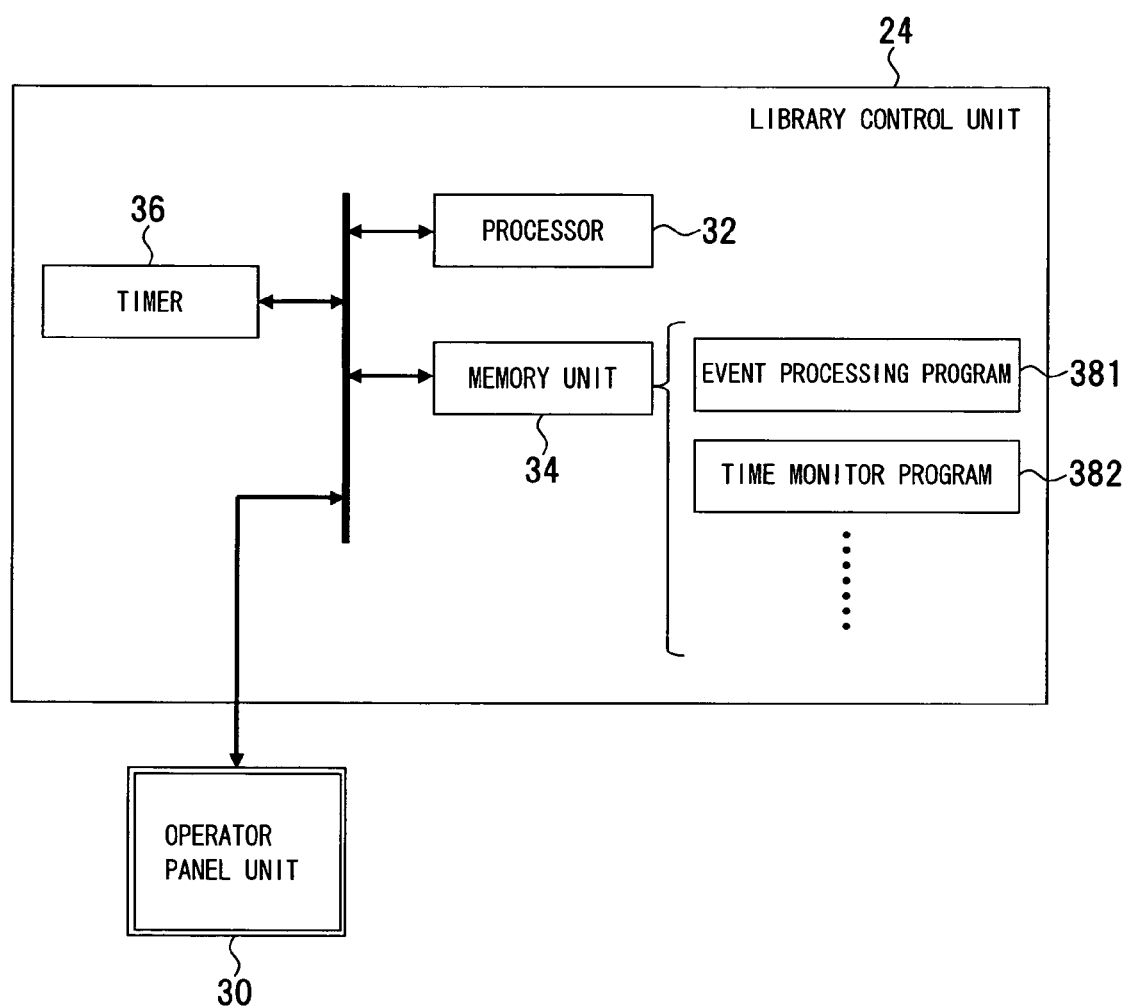
FIG. 2 is a block diagram showing a configuration example of a library control unit.

A library apparatus, control method thereof and an information processing apparatus according to an embodiment of the present invention is described with reference to FIG. 1 and FIG. 2. FIG. 1 is a block diagram showing an information processing apparatus provided with a library apparatus and FIG. 2 is a block diagram showing a configuration example of a library control unit.

The information processing apparatus 2 is provided with a library apparatus 6 along with a host computer 4, stores information in the library apparatus 6 and is used for various types of information processing with the use of the information and the like. In the information processing apparatus 2, on the library apparatus 6, a drive group 8 is installed as a write/read apparatus which writes/reads information by receiving instructions from the host computer 4, and cartridge-type recording media (hereinafter, referred to as "cartridges") 10 is stored as a plurality of recording media. In this case, the drive group 8 is constituted by a plurality of drives 81, 82, 83, 84. The cartridge 10 stores a recording medium such as a magnetic tape. For storage of the cartridges 10, a plurality of cells 12 is provided to store the cartridges 10. In other words, these cells 12 constitute a storage unit 14 for the cartridges 10.

For carrying the cartridges 10 between the cells 12 and the drive 8, first and second robot units 161, 162 are installed as a plurality of cartridge carrying mechanisms. Carrying areas of the cartridge 10 may be set to the robot units 161, 162 for the storage unit 14 or each unit may be configured to be responsible for the entire area. In the case of allocating the responsible carrying areas, if an event such as a failure is generated in one of the robots 161 and 162, the robots may be formed such that the robot 161 or robot 162 under the normal status complements the other carrying area. As used herein, the event is an event which necessitates halting of the robot unit 161 or 162, such as replacement, maintenance, inspection and failure of the robot unit 161 or 162, components thereof and the like, and includes an instruction in the case that an operator needs to halt the robot units 161, 162 as needed.

Each robot unit 161, 162 is equipped with a picker unit 18 for grabbing the cartridge 10, as well as robot movement mechanism 201, 202 for moving the picker unit 18 to the specified cell 12 or drives 81 to 84. Each robot movement mechanism 201, 202 moves the picker unit 18 of the robot unit 161, 162 in the X-axis direction, Y-axis direction and Z-axis direction, and rotates the picker unit 18 around an S axis.

In order to control these robot movement mechanisms 201, 202, the robot unit 161 is provided with a robot control unit 221 and the robot unit 162 is provided with a robot control unit 222. The robot unit 161 is supplied with power through a power-off switch 26 operated by the robot control unit 221 based on an instruction of a library control unit 24, and the robot unit 162 is supplied with power through a power-off switch 28 operated by the robot control unit 222 based on an instruction of the library control unit 24. The robot control unit 221 controls the driving and position of the robot unit 161 through the robot movement mechanism 201, and the robot control unit 222 controls the driving and position of the robot unit 162 through the robot movement mechanism 202. Power-feeding blocked portions due to the power-off switches 26, 28 may be set as portions which do not make maintenance difficult, such as the mechanism portions of the robot units 161, 162 and the like, for example. Therefore, the power-off switches 26, 28 may be configured to be operated by the library control unit 24.

The library control unit 24 receives instructions from the host computer 4 for writing or reading information as well as performs transmission and reception of information with the host computer 4, such as generation of a notification of information about processing of the event described above generated on the library apparatus 6 side, and monitors elapsed time from the stoppage of the power feeding to the robot units 161, 162. Also, the library control unit 24 is provided with an operator panel unit 30 displaying input of necessary information and information being processed, such as the information of the operator representing the event generation. Therefore, the operator panel unit 30 is an information input unit for inputting the event generation described above and also constitutes a notification unit displaying notification information for the operator.

As shown in FIG. 2, the library control unit 24 consists of a computer transmitting and receiving necessary information to and from the host computer 4 and is provided with a processor 32, memory unit 34, timer 36 and the like. The processor 32 is provided with a CPU (Central Processing Unit), RAM (Random-Access Memory) and the like. The memory unit 34 consists of a recording medium storing various data, programs and the like, and stores backup software used for various types of data processing such as data transmission and reception, an event processing program 381 used for replacement processing of the robot units 161, 162, a time monitor program 382 and others. The timer 36 constitutes a timing unit for monitoring time.

According to such a configuration: the instruction from the host computer 4 is received by the library control unit 24; in order to carry the cartridges 10, the robot units 161, 162 are controlled; and information is read or written by the drives 81 to 84.

When the periodical inspection is started as an event and, for example, if the robot 161 is replaced, the operator inputs robot replacement as instruction input from the operator panel unit 30. When receiving this input, all reservations accepted by the library control unit 24 are completed for carrying the cartridges 10 to the drives 81 to 84, and after the carrying processing is completed, a setup time notification (Not Ready) is sent as a response from the library control unit 24 to the host computer 4 and the power feeding to the robot unit 161 is stopped. The power feeding is stopped by the operation of the power-off switch 26. In this case, power feeding on the robot unit 162 side is also stopped by the operation of the power-off switch 28.

Also, due to the stoppage of the power feeding to the robot unit 161, the operator is notified of start of maintenance through the operator panel unit 30, and the timer 36 starts timing from the point of time when the power feeding is stopped. A certain time T is set for the replacement of the robot unit 161, and when the timer 36 counts the certain time T, a termination instruction for the maintenance work is notified on the operator panel unit 30. Although the certain time T may be a time needed for the robot replacement, a predetermined time may be set irrelevant to the progress of the robot replacement, since information processing is hindered if the certain time T continues for a long time. During the maintenance time, the setup time notification (Not Ready) is sent as a response from the library control unit 24 to the query from the host computer 4.

When the certain time T elapses from the stoppage of the power feeding, if the robot replacement is in progress, the power feeding is resumed after the robot replacement is discontinued and necessary recovery processing is performed. In this case, even though the robot unit 161 is broken, if the robot unit 162 is normal, regular information processing can be performed and the information processing due to the event processing is not prevented.

Figure 3:
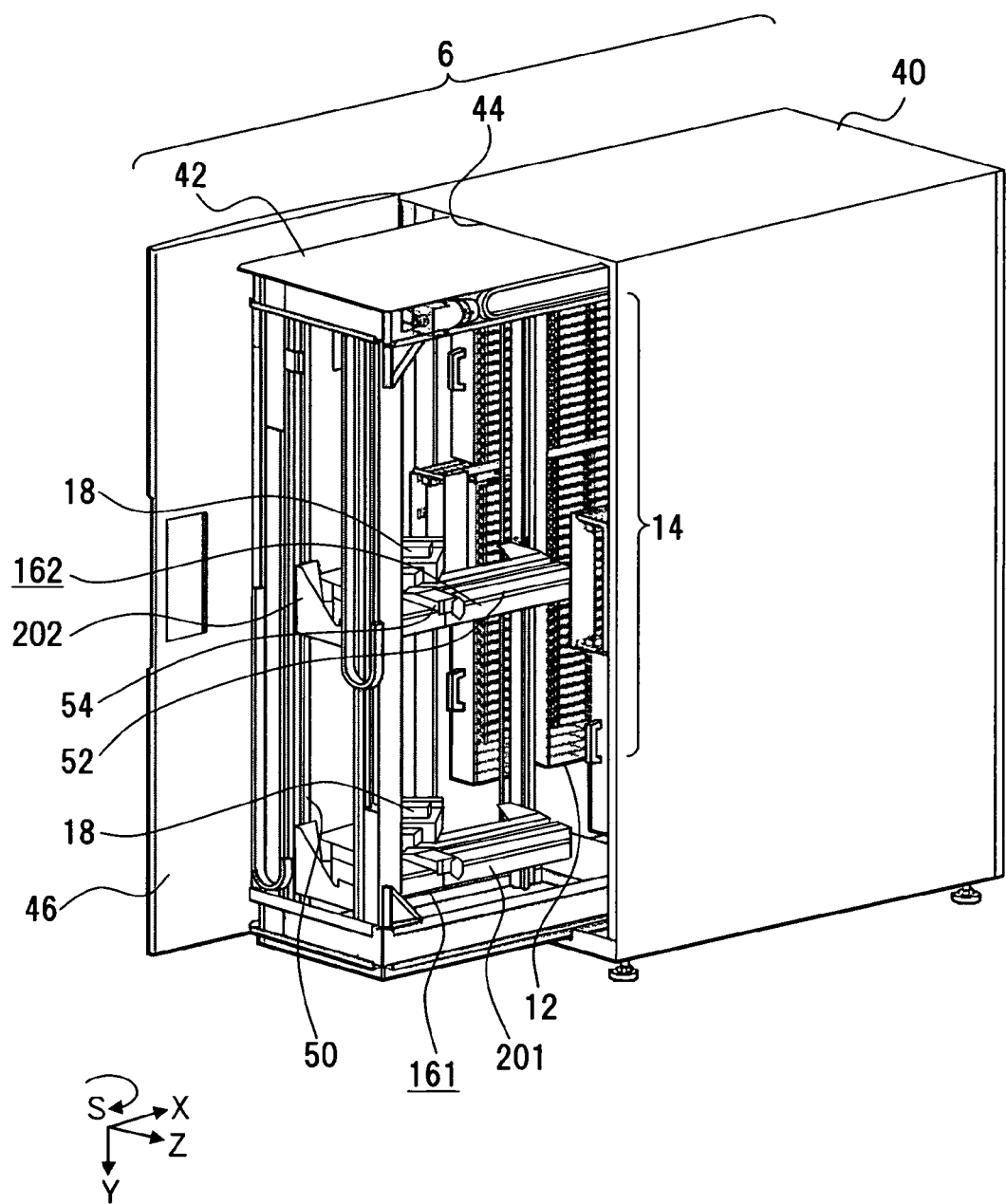
FIG. 3 is an external diagram showing a library apparatus with an inner locker pulled out.

Then, a specific example of the library apparatus 6 is described with reference to FIG. 3 and FIG. 4. FIG. 3 is an external diagram showing the library apparatus with an inner locker pulled out and FIG. 4 is a diagram showing an inner structure of the library apparatus.

The library apparatus 6 is provided with an inner locker 42 within an outer locker 40 which is an apparatus chassis. The outer locker 40 is provided with an opening 44 through which the inner locker 42 can be pulled out and the opening 44 can be opened and closed by a door 46. The door 46 is opened at the time of maintenance and inspection or failure of the internal mechanism of the inner locker 42, and FIG. 3 is in a state that a portion of the inner locker 42 is pulled out from the opening 44 with the door 46 opened.

The inner locker 42 is equipped with storage unit 14 of the cartridges 10, and the storage unit 14 is equipped with a plurality of cells 12 as well as two (2) robot units 161, 162. Each cell 12 is installed in the inner locker 42 and stores the cartridge 10 individually. The robot units 161, 162 take out the cartridge 10 to carry away from the cell 12 and carry the cartridge 10 to store into the cell 12. The robot unit 161 is equipped with the robot movement mechanism 201 moving the picker unit 18 for grabbing the cartridge 10 to a position of the desired cell 12. Also, the robot unit 162 is equipped with the robot movement mechanism 202 moving the picker unit 18 for grabbing the cartridge 10 to a position of the desired cell 12. The robot movement mechanisms 201, 202 are equipped with a rail unit 50 for moving the robot unit 161, 162 in the vertical direction (Y-axis direction), a rail unit 52 for movement in the left and right directions of the inner locker 42 (X-axis direction) and a rail unit 54 for moving the picker unit 18 in the backward and forward directions of the inner locker 42 (Z-axis direction), and the picker unit 18 is installed to be able to rotate around the S axis set to the robot units 161, 162.

Figure 4:
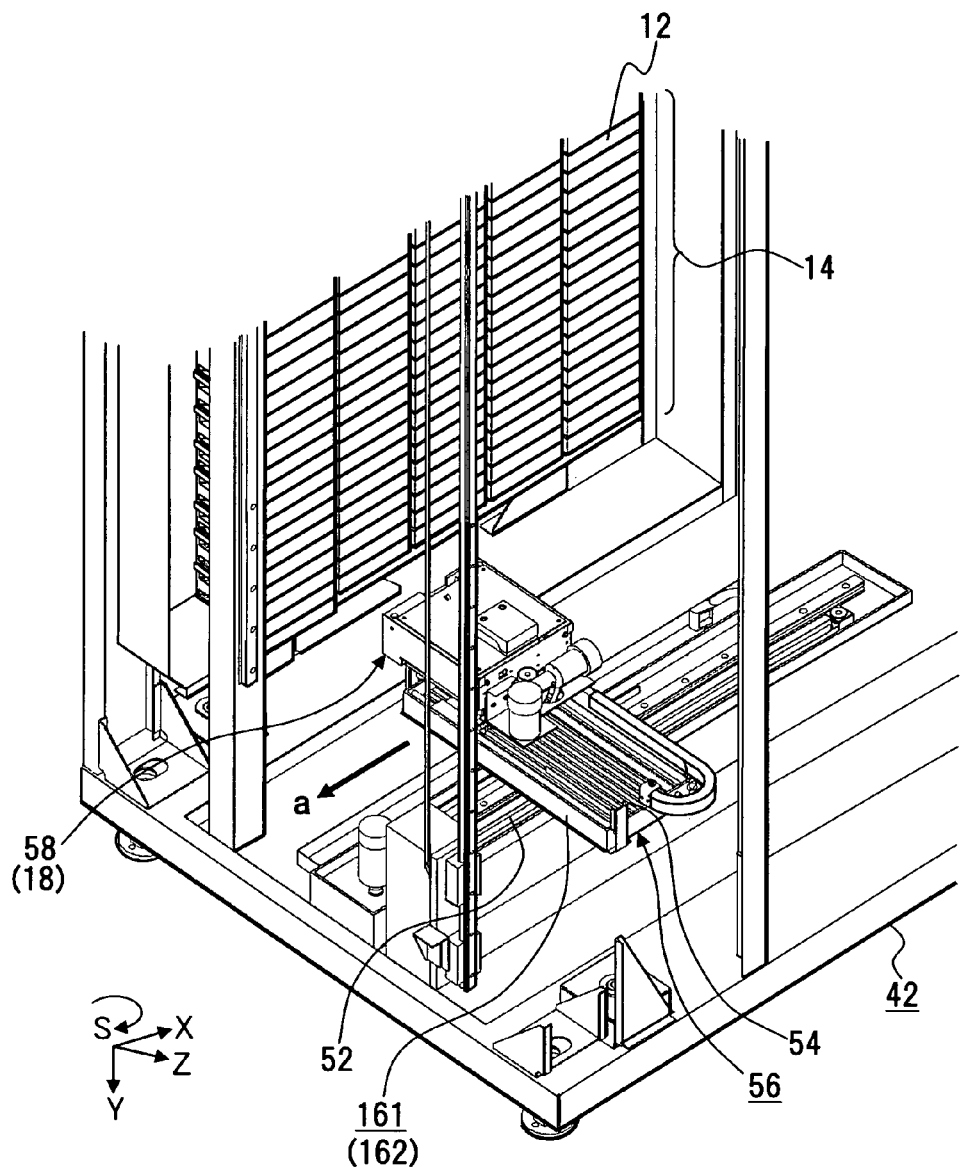
FIG. 4 is a diagram showing an inner structure of a library apparatus.

As shown in FIG. 4, the robot units 161, 162 are movably supported by the rail unit 54 and are movable on the rail unit 52 in the direction indicated by an arrow a. The robot units 161, 162 can be pulled out from the inner locker 42 along with the rail unit 52.

In such a configuration, an assembly 56 exists as a maintenance part exchangeable in the robot units 161, 162, and a subassembly 58 exists as a portion of the assembly 56. The assembly 56 may be all or some of the robot movement mechanisms 201, 202 and the robot units 161, 162. The subassembly 58 is, for example, a picker unit 18 and peripheral parts thereof configured as an exchangeable unit.

Then, the robot replacement is described as an event of the library apparatus 6 with reference to FIGS. 5A and 5B, FIGS. 6A and 6B and FIG. 7. FIGS. 5A and 5B, FIGS. 6A and 6B and FIG. 7 are diagrams showing a replacement procedure of a robot unit. In FIG. 5A to FIG. 7, the same symbols are added to the same portion as FIG. 1, FIG. 2 and FIG. 4.

Figure 5A:
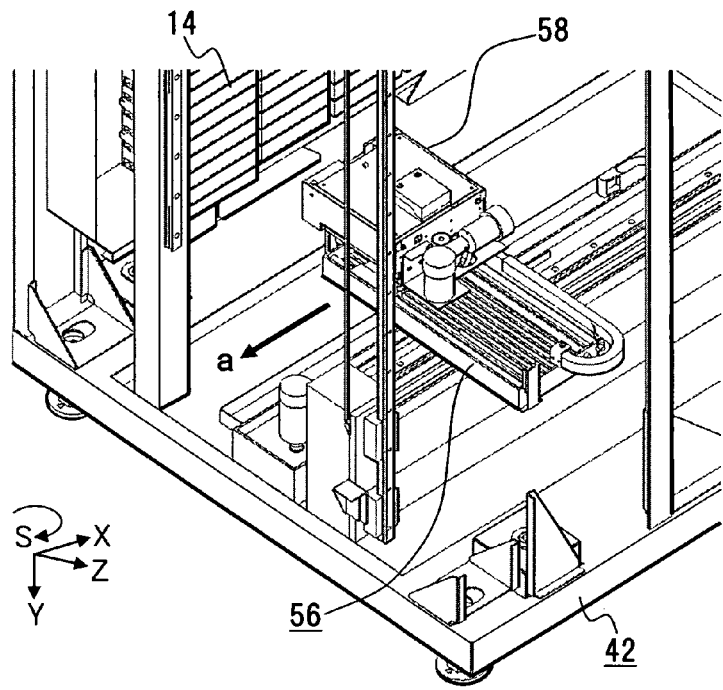
FIGS. 5A and 5B are diagrams showing a replacement procedure of a robot unit.
Figure 5B:
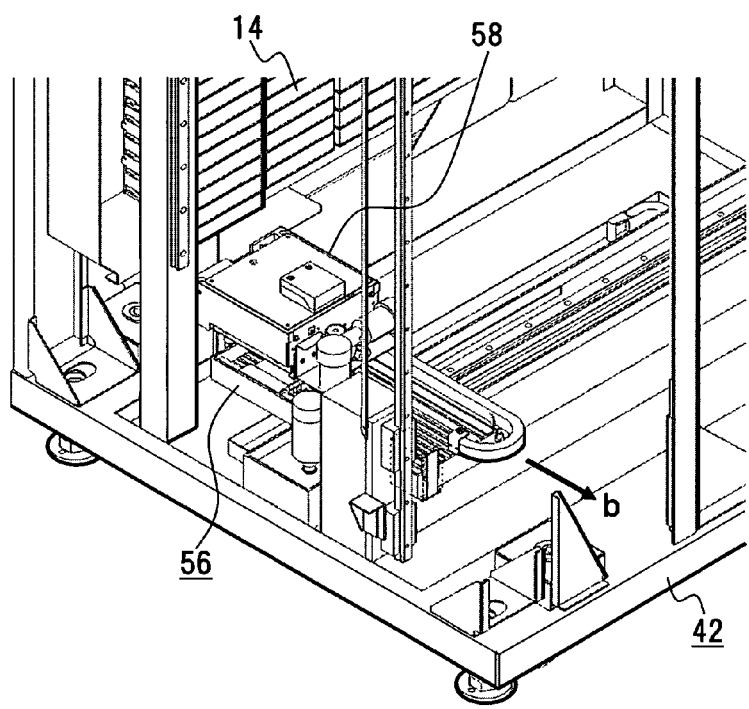

As an event generated in the library apparatus 6, in the robot replacement, after the power feeding is stopped as described above, the assembly 56 is pulled out as the maintenance part as shown in FIG. 5A. In this case, the assembly 56 in a given position is pulled out in the direction of the arrow a, and then, as shown in FIG. 5B, the subassembly 58 is moved to the center (an arrow b).

Figure 6A:
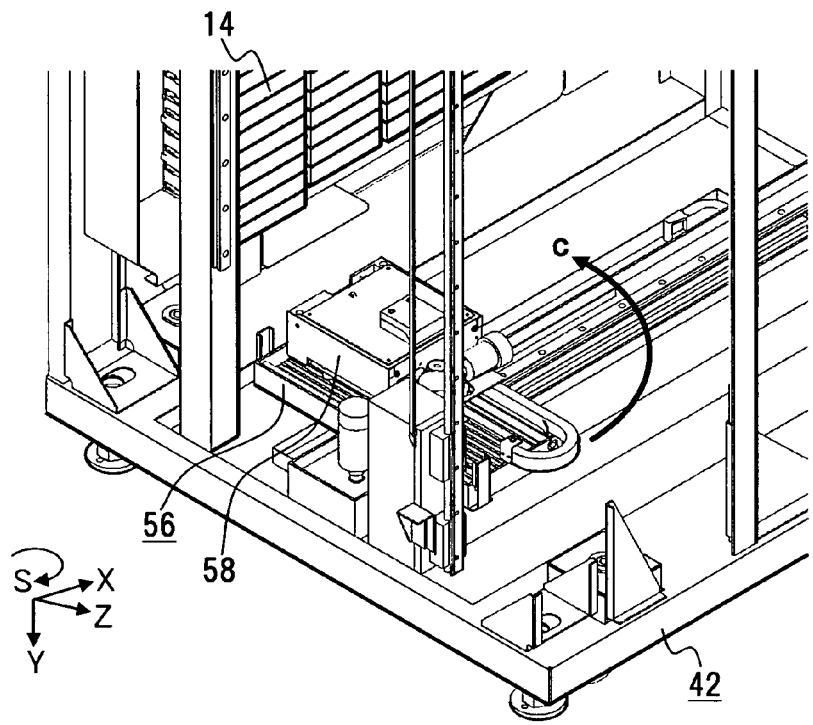
FIGS. 6A and 6B are diagrams showing a replacement procedure of a robot unit.
Figure 6B:
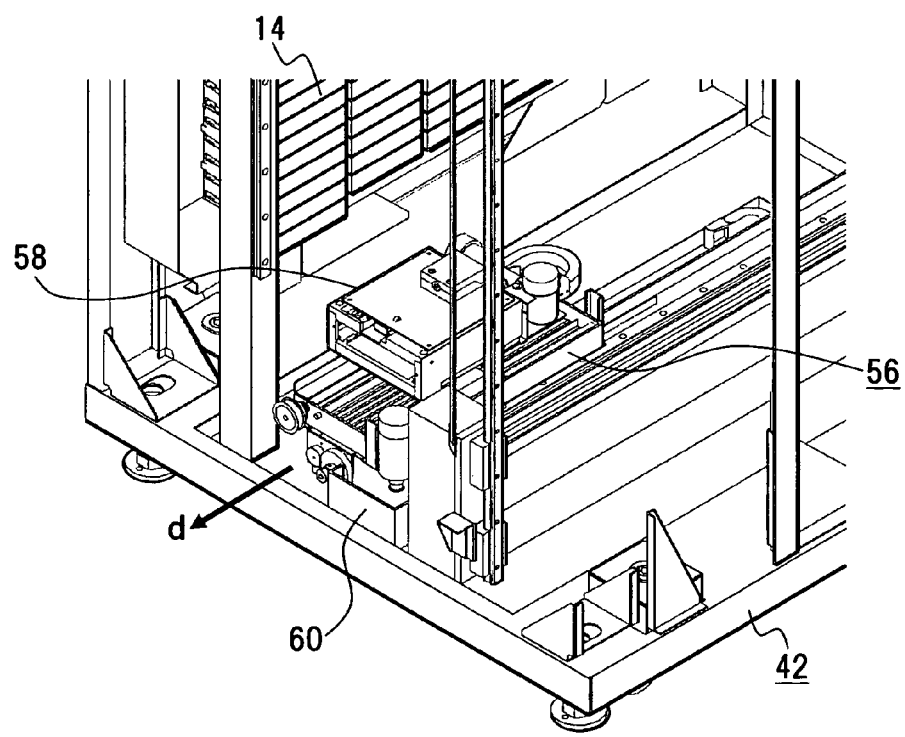
Figure 7:
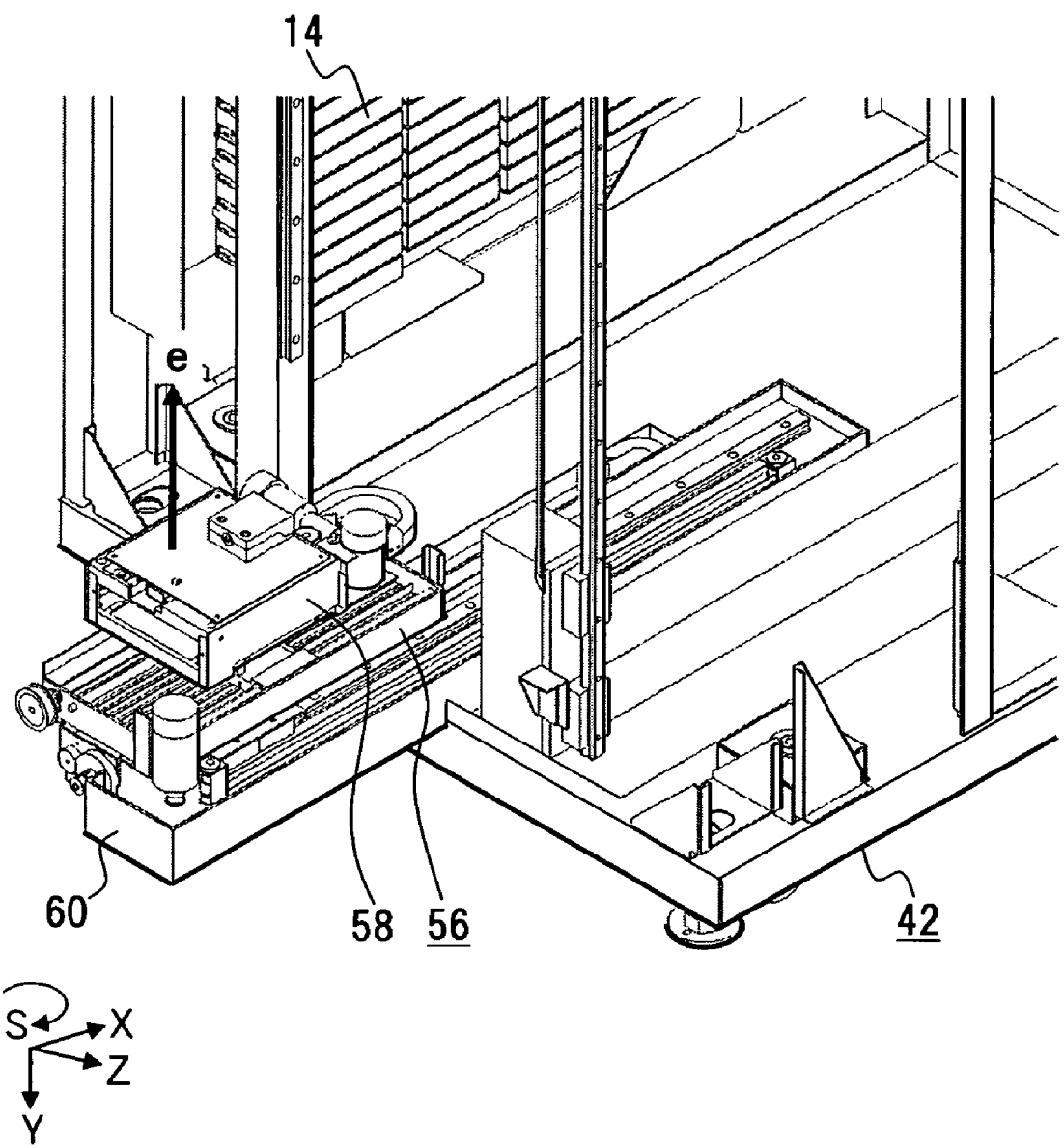
FIG. 7 is a diagram showing a replacement procedure of a robot unit.

In this state, as shown in FIG. 6A, the assembly 56 is rotated by 90 degrees (an arrow c); as shown in FIG. 6B, a slide unit 60 dedicated for maintenance is slid and pulled out from the inner locker 42 (an arrow d); and as shown in FIG. 7, the assembly 56 is detached from the pulled-out slide unit 60 (an arrow e) to be replaced.

After the replacement of the assembly 56, the slide unit 60 is returned to the inside of the inner rocker 42 again, and the robot units 161, 162 are reconstructed in the reversed order of the procedure described above, as shown in FIG. 4 (FIG. 5A).

Such robot replacement is an example and the event processing in the library apparatus 6 is not limited to such robot replacement.

Figure 8:
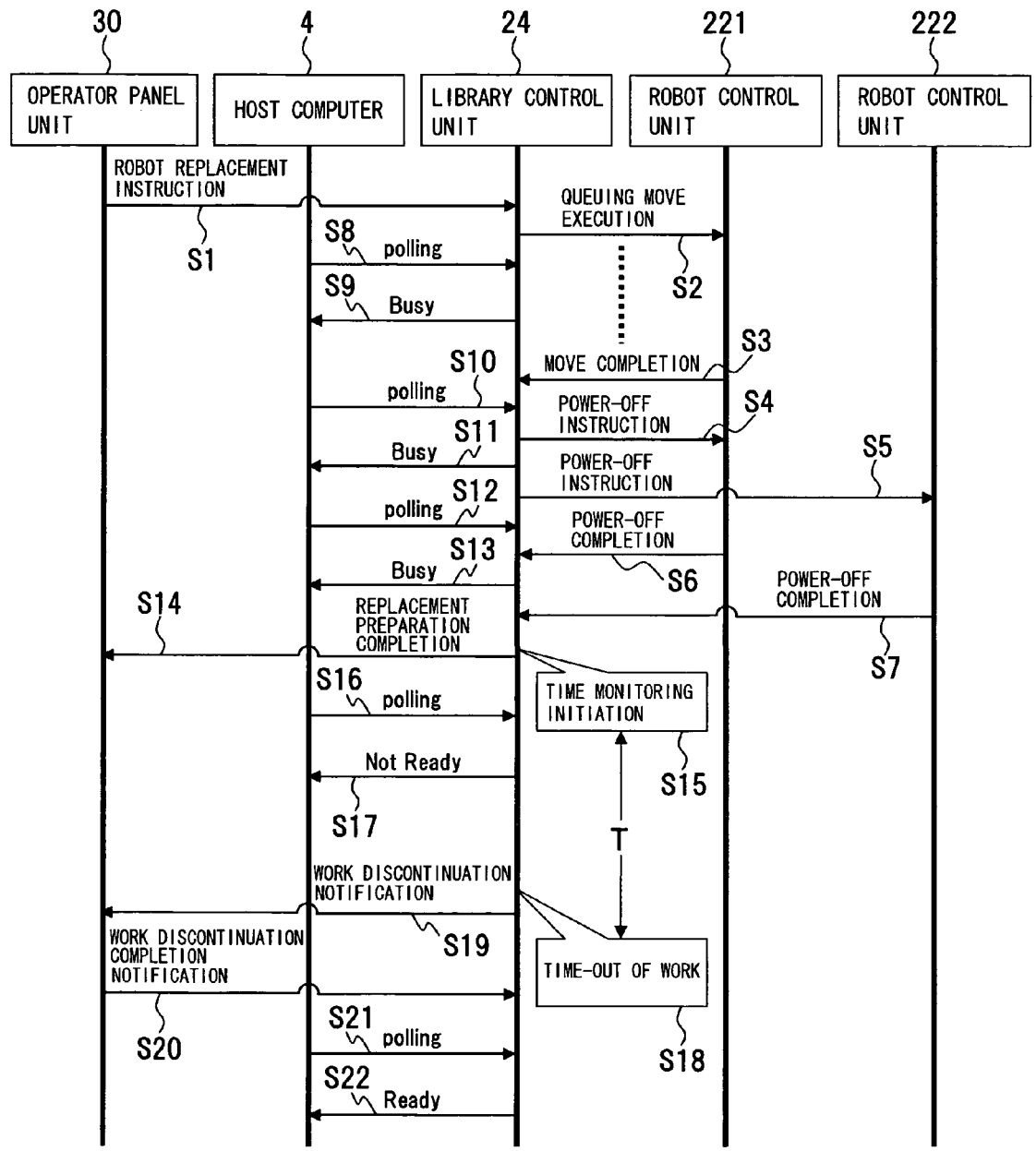
FIG. 8 is a diagram showing process sequences of an operator, a host computer and library apparatus.

Then, processing sequences of the operator, host computer and library apparatus are described with reference to FIG. 8. FIG. 8 is a diagram showing the process sequences of the operator, host computer and library apparatus.

The library control unit 24 of the library apparatus 6 is given a robot replacement instruction from the operator panel unit 30 by the operator (step S1). In this example, the replacement processing of the robot unit 161 is instructed. In other words, this is the event generation.

Based on the robot replacement instruction, execution of waiting operation (queuing move) is instructed from the library control unit 24 to the robot control unit 221 (step S2), and the waiting operation is sequentially performed. The waiting operation is the processing for completing an execution instruction before the event processing if the necessary execution instruction has been already given from the host computer 4 to the library control unit 24 at the time of the event generation, and after the robot replacement instruction, i.e., the event generation, processing is performed for once denying or suspending the execution instruction from the host computer 4.

When the waiting operation is completed on the robot control unit 221 side, a completion notification is transmitted from the robot control unit 221 to the library control unit 24 (step S3); in response to this, an instruction for power-off with a power-off switches 26, 28 is transmitted from the library control unit 24 to the robot control units 221, 222 (steps S4, S5); and when the power-off is completed, the power-off completion is notified from the robot control units 221, 222 to the library control unit 24 (steps S6, S7). In other words, after the event generation, the stoppage of the power feeding is executed for the robot units 161, 162.

In the period between step s2 and step S7, since the event processing is in progress and the library control unit 24 cannot accept the execution instruction from the host computer 24, a polling notification is transmitted from the host computer 4 as a query (step S8), and a busy notification is transmitted as a response to the polling notification, indicating that the library control unit 24 is in waiting and cannot accept the execution instruction (step S9). The polling notification is periodically transmitted from the host computer 4 (steps S10, S12), and in response to this, during the event processing, the busy notification is transmitted from the library control unit 24 (steps S11, S13) As a result, during the event processing on the library apparatus 6 side, although the linkage relationship with the host computer 4 is maintained, specific execution instructions are denied because of the waiting status.

When the library control unit 24 receives the power-off completion notifications from the robot control units 221, 222, a notification representing completion of the replacement preparation is transmitted from the library control unit 24 to the operator panel unit 30 (step S14). At this point of time, in the library control unit 24, the timer 36 starts the time monitoring, and the timing operation is initiated (step S15). After this notification of the replacement preparation completion is transmitted, when the library control unit 24 receives the polling notification from the host computer 24 (step S16), the setup time notification (Not Ready) is transmitted, representing the waiting state (step S17).

When the power feeding to the robot units 161, 162 is stopped to make the shift to the waiting time, the operator performs the robot replacement, for example, through the replacement procedure described above (FIG. 5A to FIG. 7), as the event processing.

In this case, if the replacement work exceeds the certain time T set in advance, the work becomes time-out (step S18), a work discontinuation notification from the library control unit 24 is displayed on the operator panel unit 30 (step S19). When the operator identifies this notification, the operator discontinues the replacement work, returns the robot unit 161 into the inner locker 42 through the reversed procedure of the replacement procedure described above and restores the library apparatus 6 to an operative state.

After discontinuing such a work, the operator operates the operator panel unit 30 to notify the library control unit 24 of the completion of the work discontinuation (step S20). After this notification, when the library control unit 24 receives the polling notification from the host computer 4 (step S21), a ready notification (Ready) is transmitted from the library control unit 24 (step S22), representing the shift to a state that the execution instruction can be accepted. As a result, normal information processing is enabled, and if the robot replacement is not completed, the robot replacement is performed in the next event processing.

Although, in this example, a description has been made for the case that the event processing is not completed in the certain time T, if the processing is completed in the certain time T, the operator may notify the library control unit 24 of a work completion notification from the operator panel unit 30, instead of the work discontinuation completion notification (step S20). In this case, the normal information processing can be recovered within the certain time T.

Figure 9:
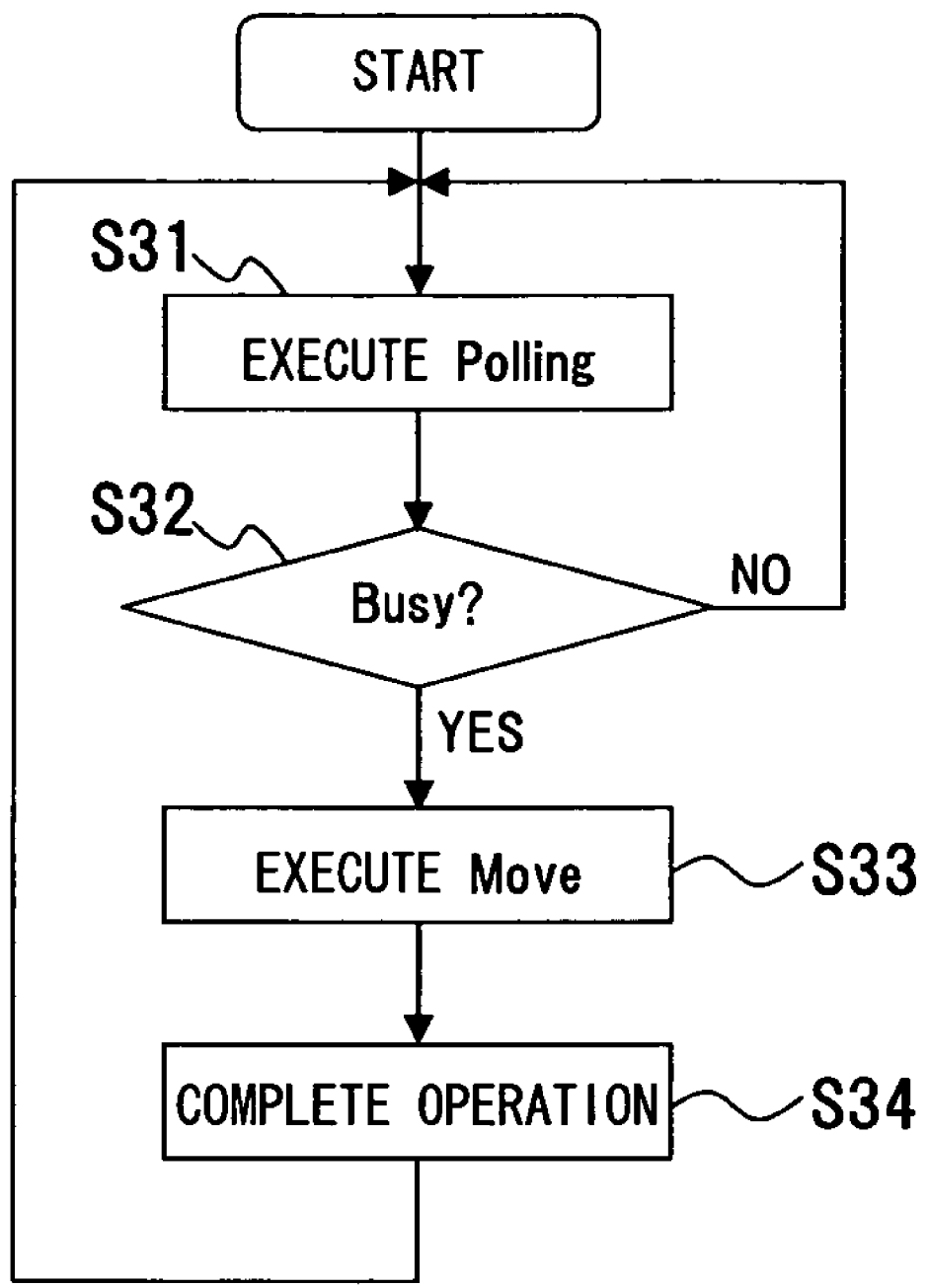
FIG. 9 is a flowchart showing control processing of a host computer.

Then, control processing of the host computer 4 is described with reference to FIG. 9. FIG. 9 is a flowchart showing the control program of the host computer 4.

In the processing on the host computer 4 side, the library apparatus 6 is checked whether the execution instruction can be processed or not, and if the execution instruction can be processed, the information of the cartridge 10 is written into or read from the library apparatus 6.

In other words, if the linkage is maintained between the host computer 4 and the library apparatus 6, the polling processing is executed from the host computer 4 (step S31); this processing checks whether or not the polling notification can trigger the library apparatus 6 to accept the execution instruction (i.e., busy or not) (step S32); if the execution instruction cannot be accepted, the procedure returns to step S31; if the execution instruction can be accepted, the execution instruction is transmitted to make the shift to the operation (step S33); and after the execution is completed (step S34), the procedure returns to step S31.

In accordance to with such processing, the time of the event processing such as the robot replacement in the library apparatus 6 can be monitored by the linkage relationship between the host computer 4 and the library control unit 24, and a down time of information processing can be kept to the minimum to achieve rational processing.

Figure 10:
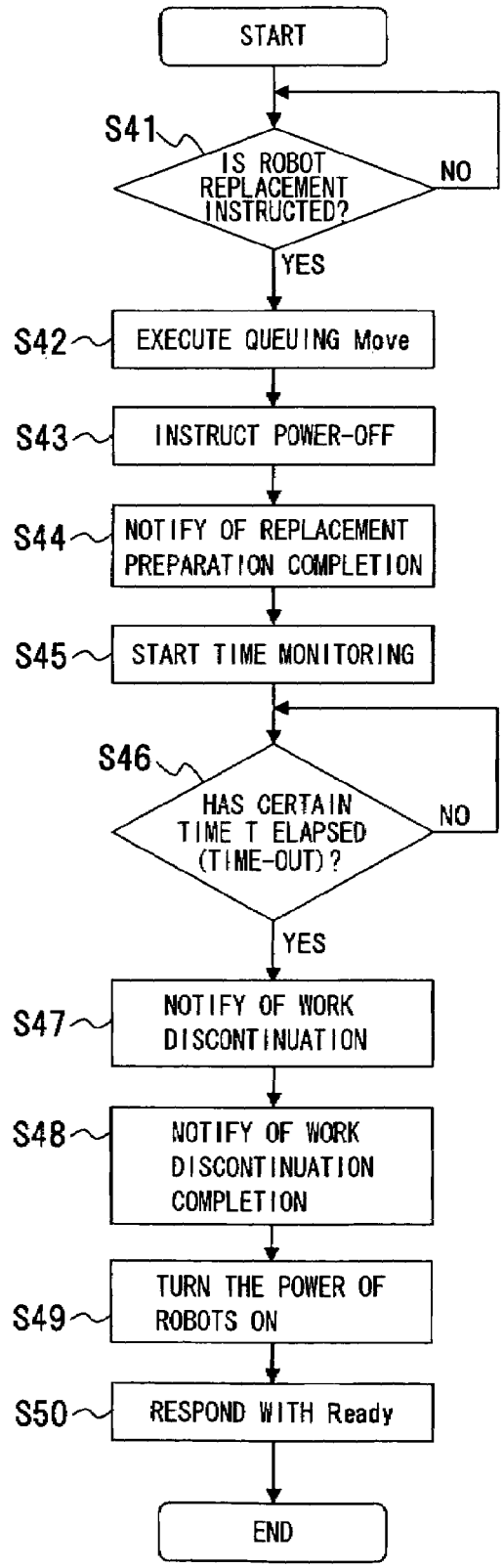
FIG. 10 is a flowchart showing control processing of a library control unit.

Then, control processing of the library control unit 24 is described with reference to FIG. 10. FIG. 10 is a flowchart showing a control program of the library control unit 24.

The library control unit 24 executes event-generation check processing, waiting operation processing, work-time monitor processing, power-feeding stop processing and recovery processing, interactive processing with the host computer 4, and the like.

The library control unit 24 monitors whether the robot replacement instruction exists or not (step S41), executes the waiting operation when receiving the robot replacement instruction (step 42) and instructs power-off to the robot control units 221, 222 and power-off switches 26, 28 after the execution (step S43).

When the power-off is completed, the robot replacement preparation completion notification is transmitted (step S44); the power-off triggers execution of the time monitoring initiation (step S45); it is monitored whether or not the certain time T elapses (step S46); and when the certain time T elapses, the work discontinuation notification is transmitted to the operator panel unit 30 regardless of the progress of the robot replacement work (step S47).

After the work is discontinued and the discontinuation is completed, the work discontinuation completion notification is received from the operator panel unit 30 operated by the operator (step S48), and this notification triggers the power feeding to the robot units 161, 162 to be started (step S49). The start of the power feeding triggers the ready notification (Ready) to be transmitted to the query from the host computer 4 (step S50), and the processing of the library control unit 24 is completed.

In this library control, during the certain time T (steps S45, S46), a notification is transmitted as the setup time notification (Not Ready) to the polling notification from the host computer 4, indicating that the processing of the execution instruction cannot be executed.

Figure 11:
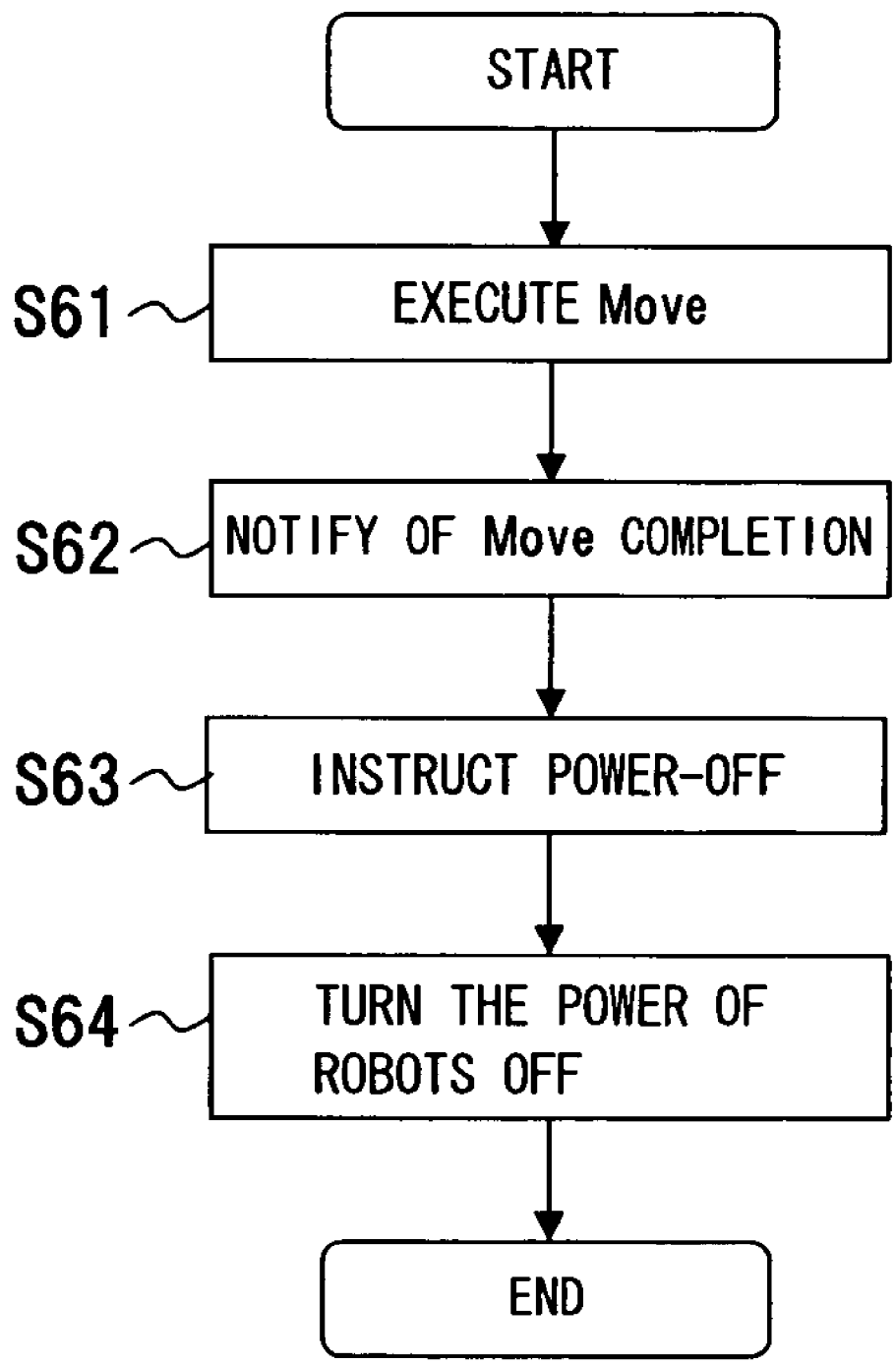
FIG. 11 is a flowchart showing control processing of a robot control unit.

Then, control processing of the robot control units 221, 222 is described with reference to FIG. 11. FIG. 11 is a flowchart showing a control program of the robot control units 221, 222.

Each robot control unit 221, 222 execute the carrying control of the cartridges 10, the power-off processing and power recovery processing and the like.

In other words, the waiting operation (Move) is executed by the execution instruction received by the library control unit 24 from the host computer 4 (step S61); after the operation is completed, the completion notification is transmitted to the library control unit 24 (step S62); and in response to the power-off instruction (step S63), the power feeding to the robot units 161, 162 is discontinued. The power-off is executed by the power-off switches 26, 28.

Characteristics and modifications of the embodiment described above are then listed and described.

(1) The robot units 161, 162 are installed in one (1) library apparatus 6 for redundancy. At the time of maintenance of the robots, the inner locker 42 equipped with each robot 161, 162 is pulled out, and the inner locker structure is provided such that the robot units 161, 162 are simultaneously pulled out by pulling out the inner locker 42.

(2) At the time of the maintenance, by sending the Not Ready response from the library apparatus 6 to the host computer 4, the robot replacement is enabled without separating the library apparatus 6 from the host computer 4 and halting backup software.

(3) Before the maintenance, all the accepted carrying operations of the cartridges 10 to the drives 81 to 84 are completed; reading from and writing to the drives 81 to 84 are controlled to be continuously executed; the down time of the robot units 161, 162 is minimized; and impact on information processing can be reduced.

(4) If the maintenance time, i.e., work time exceeds the certain time, the operator is notified by an alarm and instructed to assemble the robot units 161, 162 once, and thereby, the carrying operation is enabled by the robot unit 161 or 162 which is not broken.

(5) Although the robot replacement is exemplified as the event processing in the embodiment, the event on the library apparatus 6 side is not limited to the robot replacement and includes various events that the operator stops power feeding to the robot units 161, 162 as needed.

(6) Although the power-feeding blocked portions due to the power-off switches 26, 28 is exemplified as portions which do not make maintenance in the robot units 161, 162 difficult, the power-feeding blocked portions may be configured such that the power feeding to the robot movement mechanisms 201, 202 is entirely or partially blocked or such that all or some of the functions of the robot control units 221, 222 are halted.

In this way, the embodiment is used in the library apparatus storing a recording medium for writing and reading information with the host computer and is useful because the event processing such as the robot replacement on the library apparatus side can be performed without terminating linkage operation with the host computer.

Although the most preferred embodiments of the present invention have been described hereinabove, the present invention is not intended to be limited to the description and can naturally be modified or changed by one skilled in the art based on the gist of the present invention defined in claims or disclosed in the specification, and it is needless to say that such modifications and changes are within the scope of the present invention.

What is claimed is:

1. A library apparatus storing one or more recording mediums for writing and reading information with a host computer, comprising:
    a plurality of robot units, each robot unit configured to carry the recording mediums; and
    a control unit, which, if an event is generated, stops power from being fed to the robot units until a predetermined time, which is set irrelevant of the progress of the event, elapses, the control unit maintaining a state that is able to respond to the host computer during the predetermined time, and transmitting, in response to a query from the host computer, a response representing that the processing of the event is in progress;
    wherein if an execution instruction has already been given from the host computer to the control unit before the event generation, the control unit makes the robot units operate to complete the execution instruction in advance of the stoppage of power to the robot units; and
    if the predetermined time elapses, the control unit discontinues the event irrelevant of the completion of the event, and resumes feeding power to the robot units.

2. The library apparatus of claim 1, further comprising:
    an information input unit for inputting information representing the event generation.

3. The library apparatus of claim 1,
    wherein the control unit accepts an instruction from the host computer after transmitting to the host computer a notification output representing that the event is completed.

4. A library apparatus storing one or more recording mediums for writing and reading information with a host computer, comprising:
   a plurality of robot units, each robot unit configured to carry the recording mediums; and
   a control unit, which, if an event is generated, stops power from being fed to the robot units until a processing time of the event or a predetermined time elapses, the control unit transmitting, in response to a query from the host computer, a response representing that the processing of the event is in progress,
   wherein the control unit monitors a passage of time from the stoppage of power to the robot units and generates a notification output representing that the predetermined time has elapsed.

5. The library apparatus of claim 4, further comprising:
   a notification unit which issues an alarm due to the notification output.

6. A control method of a library apparatus storing one or more recording mediums for writing and reading information with a host computer, the method comprising the steps of:
   using robot units to carry the recording mediums;
   stopping power from being fed to the robot units, if an event is generated, until a predetermined time, which is set irrelevant of the progress of the event, elapses, maintaining a state that is able to respond to the host computer during the processing time of the event or the predetermined time, and transmitting in response to a query from the host computer, a response representing that the processing of the event is in progress;
   operating the robot units to complete an execution instruction in advance of the stoppage of power to the robot units in a case where the execution instruction has already been given from the host computer to the control unit before the event generation; and
   if the predetermined time elapses, discontinuing the event irrelevant of the completion of the event, and resuming to feed power to the robot units.

7. The control method of a library apparatus of claim 6, further comprising the step of:
   inputting information representing the event generation into an information input unit.

8. The control method of a library apparatus of claim 6, further comprising the step of:
   accepting an instruction from the host computer after transmitting to the host computer a notification output representing that the event is completed.

9. A control method of a library apparatus storing a recording medium for writing and reading information with a host computer, the method comprising the steps of:
   using robot units to carry the recording medium;
   stopping power from being fed to the robot units, if an event is generated, until a processing time of the event or a predetermined time elapses, and transmitting in response to a query from the host computer, a response representing that the processing of the event is in progress; and
   monitoring a passage of time from the stoppage of power to the robot units and generating a notification representing that the predetermined time has elapsed.

10. The control method of a library apparatus of claim 9, further comprising the step of:
    issuing an alarm based on the notification.

11. A computer readable medium having a control program of a library apparatus storing one or more recording mediums for writing and reading information with a host computer, the program causing the library apparatus to execute the steps of:
    using robot units to carry the recording medium;
    stopping power from being fed to the robot units, if an event is generated, until a predetermined time, which is set irrelevant of the progress of the event, elapses, maintaining a state able to respond to the host computer during the predetermined time, and transmitting in response to a query from the host computer, a response representing that the processing of the event is in progress;
    operating the robot units to complete an execution instruction in advance of the stoppage of power to the robot units in a case where the execution instruction has already been given from the host computer to the control unit before the event generation; and
    if the predetermined time elapses, discontinuing the event irrelevant to completion of the event, and resuming to feed power to the robot units.

12. The computer readable medium of claim 11, wherein the control program further causes the library apparatus to execute the step of:
    inputting information representing the event generation into an information input unit.

13. The computer readable medium of claim 11, wherein the control program further causes the library apparatus to execute the step of:
    accepting an instruction from the host computer after transmitting to the host computer a notification output representing that the event is completed.

14. A computer readable medium having a control program of a library apparatus storing recording mediums for writing and reading information with a host computer, the program causing the library apparatus to execute the steps of:
    using robot units to carry the recording medium;
    stopping power from being fed to the robot units, if an event is generated, until a processing time of the event or a predetermined time elapses, and transmitting in response to a query from the host computer, a response representing that the processing of the event is in progress; and
    monitoring a passage of time from stoppage of power to the robot units and generating a notification representing that the predetermined time has elapsed.

15. The computer readable medium of claim 14, wherein the control program further causes the library apparatus to execute the step of:
    issuing an alarm based on the notification.

16. An information processing apparatus comprising a host computer and a library apparatus storing recording mediums for writing and reading information,
    wherein the library apparatus comprises:
    a plurality of robot units, which carry the recording mediums; and
    a control unit, which, if an event is generated, transmits in response to a query of the host computer a notification representing a processing of an event, which stops power from being fed to the robot units until a predetermined time, which is set irrelevant of the progress of the event, elapses, which keeps up a state that is able to respond to the host computer during the predetermined time, which discontinues the event irrelevant of the completion of the event if the predetermined time elapses, and which resumes feeding power to the robot units to accept an instruction from the host computer; and
    wherein if an execution instruction has already been given from the host computer to the control unit before the event generation, the control unit makes the robot units operate to complete the execution instruction in advance of the stoppage of power to the robot units.

17. The information processing apparatus of claim 16, wherein the library apparatus comprises:
   an information input unit for inputting information representing the event generation.

18. The information processing apparatus of claim 16, wherein the control unit accepts an instruction from the host computer after transmitting to the host computer a notification output representing that the event is completed.

19. An information processing apparatus comprising a host computer and a library apparatus storing recording mediums for writing and reading information,
   wherein the library apparatus comprises:
      a plurality of robot units, each robot unit configured to carry the recording mediums; and
      a control unit, which, if an event is generated, transmits in response to a query of the host computer a notification representing a processing of the event, which stops power being fed to the robot units during the processing of the event and which resumes the power being fed to the robot units after completion of the processing of the event or after a predetermined time has elapsed to accept an instruction from the host computer, wherein the control unit monitors a passage of time from the stoppage of power to the robot units and generates a notification output representing that the predetermined time has elapsed.

20. The information processing apparatus of claim 19, wherein the library apparatus further comprises:
   a notification unit which issues an alarm due to the notification output.

* * * * *